(12) United States Patent
Kwon et al.

(10) Patent No.: US 6,593,986 B2
(45) Date of Patent: *Jul. 15, 2003

(54) METHOD FOR MANUFACTURING A MULTI-DOMAIN LIQUID CRYSTAL CELL

(75) Inventors: Soon Bum Kwon, Seoul (KR); Jong Hyun Kim, Seoul (KR); Oleg Yaroshchuk, Kyyiv (UA); Andrey Dyadyusha, Kiev (UA)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/108,229

(22) Filed: Jul. 1, 1998

(65) Prior Publication Data

US 2003/0112395 A1 Jun. 19, 2003

Related U.S. Application Data

(62) Division of application No. 08/815,110, filed on Mar. 11, 1997, now Pat. No. 5,853,818.

(30) Foreign Application Priority Data

Jul. 29, 1996 (KR) .......................................... 96-30940

(51) Int. Cl.⁷ .......................................... G02F 1/1337
(52) U.S. Cl. .................................... 349/124; 349/123
(58) Field of Search ............................ 349/124, 123, 349/128, 129, 191, 94

(56) References Cited

U.S. PATENT DOCUMENTS

| | | | |
|---|---|---|---|
| 5,389,698 A | 2/1995 | Chigrinov et al. ............. | 522/2 |
| 5,623,354 A | * 4/1997 | Lien et al. ................... | 349/124 |
| 5,757,455 A | * 5/1998 | Sugiyama et al. .......... | 349/129 |
| 5,764,326 A | * 6/1998 | Hasegawa et al. .......... | 349/124 |
| 5,838,407 A | * 11/1998 | Chigrinov et al. .......... | 349/187 |
| 5,853,818 A | * 12/1998 | Kwon et al. ................. | 427/510 |
| 6,091,471 A | * 7/2000 | Kim et al. ................... | 349/124 |

FOREIGN PATENT DOCUMENTS

| | | |
|---|---|---|
| DE | 196 54 638 A1 | 7/1997 |
| EP | 0 667 554 A | 8/1995 |
| FR | 2 743 155 | 7/1997 |
| FR | 2 743 429 | 7/1997 |

OTHER PUBLICATIONS

Lien et al., "UV modification of surface pretilt of alignment layers for multidomain liquid crystal displays", Appl. Phys. Lett., vol. 67, no. 21, pp. 3108–3111, Nov. 1995.*

Myrvold et al., Liquid Crystal Alignment on Polymer Films: Changes of the Pretilt Angles Due to the Thermal Treatment of Polyalkylene Pyromellitimides, Jpn. J. Appl. Phys. vol. 32 (1993), pp. 5052–5058, Nov. 1993.*

Schadt, M. et al., "Optical Patterning of Multi–Domain Liquid–Crystal Displays with Wide Viewing Angles," Nature, GB, MacMillan Journals, Ltd., London, vol. 381, May 16, 1996 pp. 212–215.

* cited by examiner

Primary Examiner—Robert H. Kim
Assistant Examiner—Dung Nguyen
(74) Attorney, Agent, or Firm—Finnegan, Henderson, Farabow, Garrett, & Dunner, L.L.P.

(57) ABSTRACT

A method for fabricating a multi-domain liquid crystal cell is disclosed, wherein first and second alignment directions are formed in first and second portions of an alignment layer provided on a substrate by selectively subjecting the first and second portions to different energy doses of linearly polarized ultraviolet light. Liquid crystal material is then injected between the one substrate and another substrate and into contact with the alignment layer, thereby obtaining a wide viewing angle in the liquid crystal device.

12 Claims, 8 Drawing Sheets

METHOD FOR MANUFACTURING A MULTI-DOMAIN LIQUID CRYSTAL CELL

This is a division of application Ser. No. 08/815,110, filed Mar. 11, 1997, now U.S. Pat. No. 5,853,818, which is incorporated herein by reference.

BACKGROUND OF THE INVENTION

The present invention relates to a method for manufacturing a multi-domain liquid crystal cell, and more particularly to a method for manufacturing a multi-domain liquid crystal cell in which the liquid crystal director is aligned by irradiating an alignment layer with light.

Liquid crystal displays, or LCDs, generally include two transparent substrates with liquid crystal material injected therebetween. The liquid crystal (LC) material typically includes anisotropic molecules, the average direction of the long axes which are referred to as the director of the LC material. The director distribution in bulk LC material is determined by its azimuthal anchoring energy of the LC molecules on the substrates and characterized, in part, by the axes of easy orientation, which correspond to the minimum surface energy of the LC material. Additional parameters determining the director distribution include the pretilt angle between the director and the substrate plane.

In order to obtain uniform brightness and high contrast ratio of the LCD, the LC molecules must be appropriately aligned or homogeneously aligned after being injected between the substrates of the display.

Alignment of the LC molecules is achieved by providing an alignment layer on the surface of the substrate. Preferably, the alignment layer includes a plurality of directional "domains" or regions having different alignment directions. If a plurality of binary domains, i.e., domains oriented in different directions, are provided on the surface of the alignment layer, a uniform viewing angle can be achieved. Both the value of the director tilt and the direction of this tilt (i.e., direction of the axis of easy orientation) are important for normal operation of LC devices having such binary, as well as multi-domain structures.

The alignment layer is typically fabricated by depositing a specially treated polymer on the surfaces of the substrates of the display. In accordance with one conventional technique, homogenous alignment is achieved by subjecting the polymer to a rubbing process to mechanically form alignment microgrooves in the polymer layer. The liquid crystal molecules are thus homogeneously or uniformly aligned due to the intermolecular interaction between the polymer of the alignment layer and the liquid crystal molecules.

In the above described rubbing process, however, defects are formed in the microgrooves which cause light scattering and random phase distortion. Moreover, dust and electrostatic discharges are produced in the alignment layer, so that the substrate is damaged and yield is decreased.

LC alignment by irradiation of photosensitive polymers with polarized UV light has been proposed as an alternative to rubbing (M. Schadt et al., Jpn. J. Appl. Phys., 31 (1992). p. 2155; T. Marusii and Yu. Reznikov et al., Mol., Master., 39, 1993, p. 161). The aligning ability of these photosensitive materials is determined by their anisotropic photo-induced properties. In the present invention, the photoalignment process is applied to create an array of domains where the easy orientation axes can possess two possible orthogonal directions.

Materials based on polyvinyl cinnamate, polysiloxane and polyamide are the most common photoaligning materials for LC displays. The directions of the easy axes in the plane of an aligning material were reported to be usually perpendicular to UV light polarized electron.

Such alignment techniques have advantages over the conventional rubbing method described above. In particular, electrostatic charges and dust are not produced on the aligning surface, as in the rubbing process. Further, by appropriate exposure of the photosensitive polymer, it is possible to control the direction of the easy orientation axis on the aligning surface and the azimuthal anchoring energy value. Further, the prescribed director distribution in an LC cell can be created.

Photoalignment techniques can also be used to generate a plurality of binary domains or a binary multi-domain structure. In one such technique described in W. Gibbon et al. (Nature, 351 (1991), p. 49), a first photosensitive substrate is rubbed unidirectionally, followed by irradiation of the substrate through a mask with polarized light to induce the easy axis perpendicular to the direction of rubbing. When the LC cell is assembled by injecting LC molecules between the first substrate and a second polymer-coated substrate which was rubbed in the same direction as the photosensitive material, the LC molecules are oriented with a 90°-twisted in regions corresponding to the transparent parts of the mask. Instead of a mask, an image formation optical system in the plane of the substrate can be used. The main drawback of this method is the necessity to use rubbing, which leads to the accumulation of dust and electrostatic charge, as well as the formation of distorted microgrooves on the aligning surfaces.

In another technique described in P. Shenon et al. (Nature, 368 (1994), p. 532), instead of rubbing the photoaligning surface, the photoalignment layer is exposed with polarized light to impart on an initial background alignment director. This method is free of the drawbacks described above, but has its own disadvantages. Namely, this method requires a double exposure of light with orthogonal polarization that requires rearrangement of the apparatus used to perform the optical exposure.

SUMMARY OF THE INVENTION

An object of the present invention is to provide a simple method for producing binary multi-domain directional alignment in an LC cell, which does not possess the drawbacks of the known methods. It is a further object of the present invention to create binary multi-domain directors in an alignment layer without any rearrangement of the optical scheme.

It has been discovered that the initial easy axis of the polymer fused in photoalignment techniques change sharply by 90° when the intensity or dose of incident light exceeds a particular threshold.

Thus, in accordance with the present invention a method for controlling the alignment direction is provided, comprising the steps of coating a substrate with an alignment layer of a photosensitive material; irradiating the alignment layer with a first energy dose of light to impart a first alignment direction; irradiating the alignment layer with a second energy dose of light to impart a second alignment direction, the second alignment direction being perpendicular to the first alignment direction.

In addition, the method for fabricating a multi-domain LC cell using the substrate made from the above method comprises the steps of providing a first substrate and a second substrate, the first substrate is covered with a first alignment layer and the second substrate is covered with a second alignment layer; irradiating the first and second alignment layers with light to impart different alignment directions depending upon the light energy dose absorbed in each domain; assembling a cell from two substrates where the alignment layers face one another; and injecting LC material between the first and second substrates. Control of the energy dose absorbed in each domain can be achieved by varying the radiation intensity or duration.

According to another aspect of the present invention, the photosensitive material for the alignment layer comprises polymers illustrated in FIGS. 1–4.

The invention will be set forth in part by the detailed description that follows and, in part, will be made obvious from this description, or may be learned by practice of the invention. The objectives and advantages of the invention will be realized and attained by means of the actions action and their combinations pointed out in the appended claims.

The accompanying drawings, which are incorporated in and constitute a part of this specification, illustrate an embodiment of the invention and together with the description, serve to explain the principles of the invention.

DETAILED DESCRIPTION OF THE INVENTION

Figure 7:
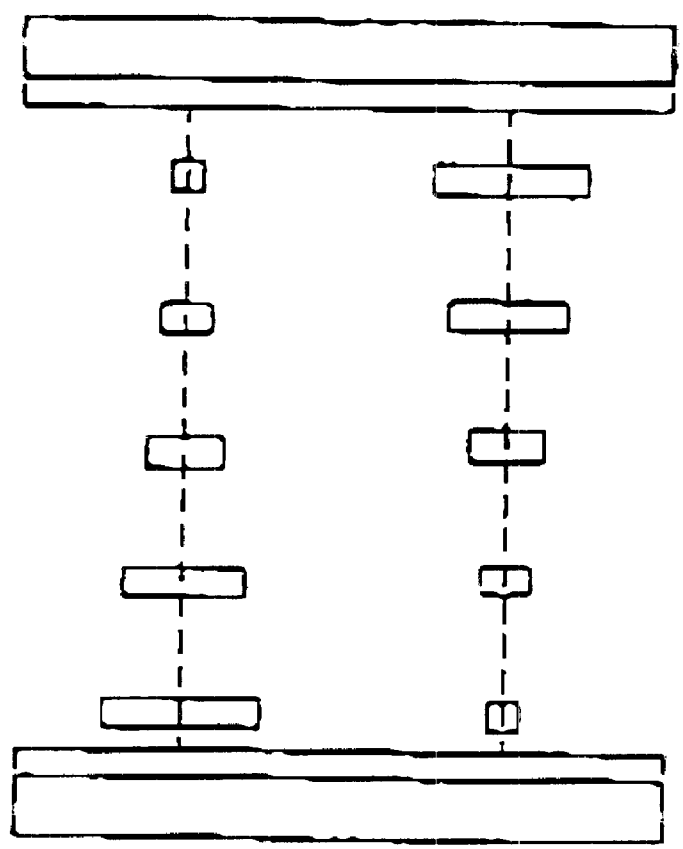
FIG. 7 shows cross-sectional view illustrating a Two-Domain TN structure invention.
Figure 8:
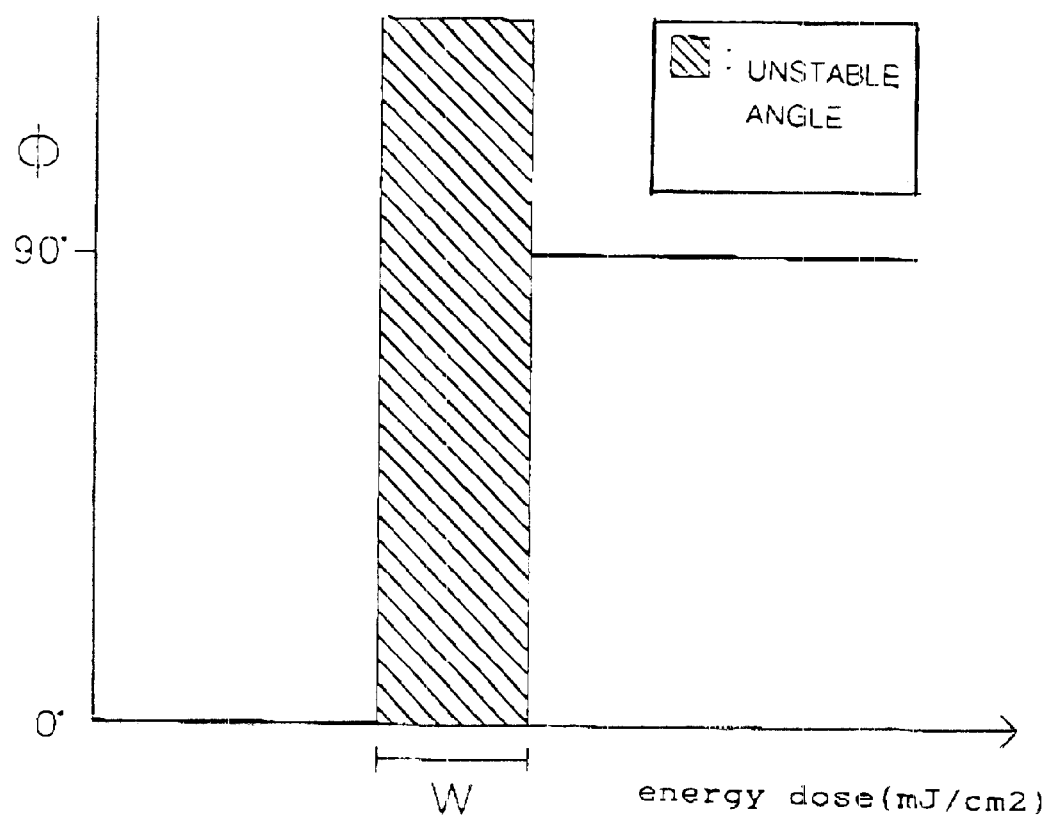
FIG. 8 shows a graph illustrating relationship between the photo-energy and alignment direction.

It has been discovered that, in certain materials, the alignment axis can change depending on the intensity of incident light and/or duration thereof. For example, FIG. 8 illustrates the relationship between the alignment direction ($\phi$) and the energy density of the incident light for a material such as PSCN-1. As seen in FIG. 7, $\phi$ is approximately zero for energy densities below range W. In range W, however, $\phi$ is indeterminate or undefined, and is some unstable angle other than zero, e.g., 90 degrees. Therefore, the direction of the alignment axis can vary in accordance with energy dose of incident light ($D=I_{exp} \times t_{exp}$). For example, the direction of the orientation of standard LC molecules in contact with an alignment layer formed with a material, such as PSCN-1, can shift by 90° if the energy density of incident light exceeds a predetermined value.

Figure 1:
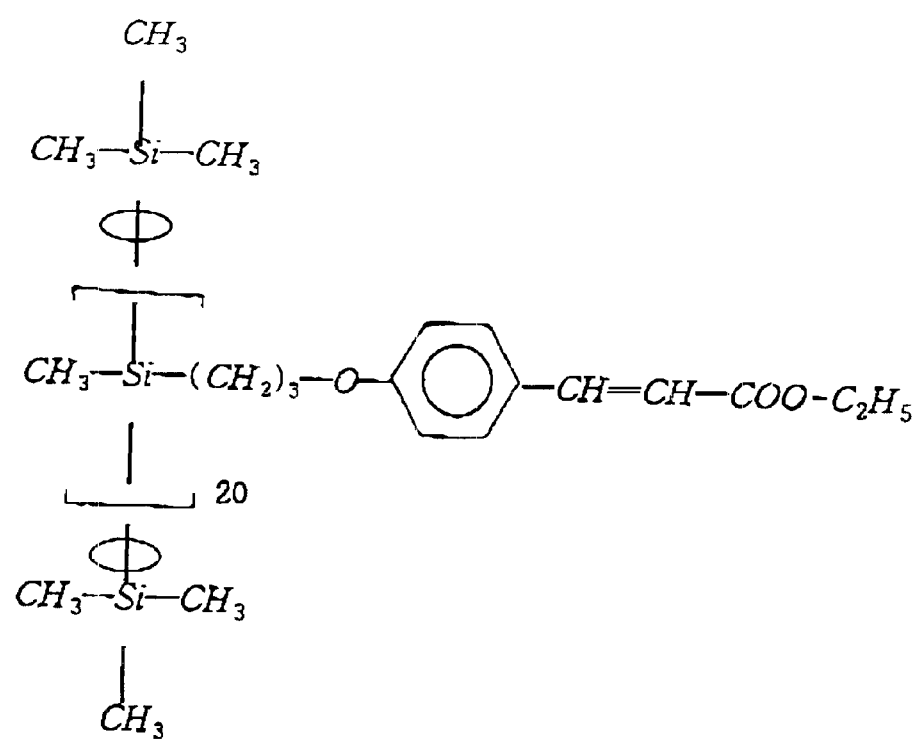
FIG. 1 shows the chemical structure of photoalignment material PSCN-1 according to an embodiment of the present invention.

Specifically, the irradiation of PSCN-1 material (shown in FIG. 1) by polarized nonfiltered light emitted by an Hg lamp with intensity $I_{exp}=2$ mW/cm² at wavelength 250 nm, for an expansion time $t_{exp}=5$ min, results in a dose (D=0.6 J) creating an easy axis e parallel to the direction polarization of the light $E_{exp}$. In contrast, for exposure time $t_{exp}=t_{thr}>10$ min ($D_{thr}=1.6$ J), however the direction [e] becomes perpendicular to $E_{exp}$. In the intermediate region, no stable alignment is found.

Instead of irradiation during $t_{exp}$, one can change the intensity of light $I_{exp}$ to obtain the same effect. Accordingly, for example, PSCN-1 material can have a light-induced easy axis e parallel to $E_{exp}$ at $t_{exp}=5$ min and $I_{exp}=2$ mW/cm². However, an orthogonal direction can be obtained for the same $t_{exp}$, i.e., $t_{exp}=5$ min, but with $I_{exp}=4$ mW/cm².

Figure 2:
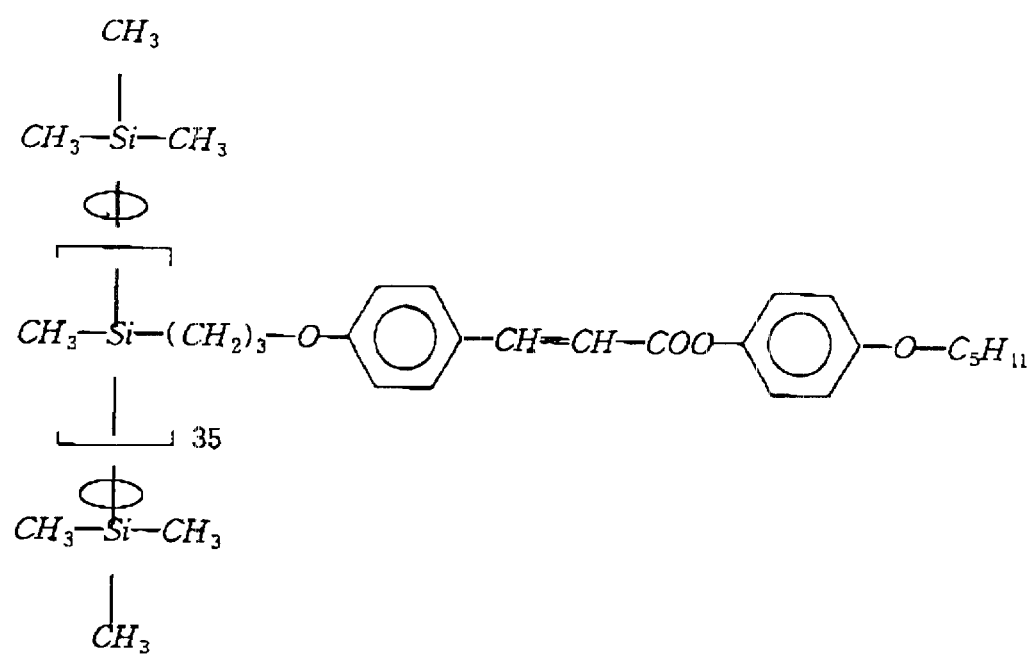
FIG. 2 shows the chemical structure of photoalignment material PSCN-2 according to an embodiment of the present invention.

Moreover, the exposure time needed to change the orthogonal position can be effectively controlled by doping PSCN-1 with a material causing the PSCN-1 to be more susceptible to only one easy axis direction. In addition, the exposure intensity is saved by doping PSCN-1 with 10% by weight of the photooriental PSCN-2, as shown in FIG. 2, herefore, having a stable easy axis perpendicular to $E_{exp}$ can be obtained with half the threshold dose $D_{thr}$ as that noted above. Thus, with an exposure energy density of 1 mW/cm², the above described mixture of PSCN-1 can be exposed for 5 minutes to impart an alignment direction parallel to the polarization of the incident light, and for 10 minutes to impart an alignment direction perpendicular to the polarization of the incident light. The same effect was observed for other photoalignment direction perpendicular to the polarization of the incident light.

Figure 3:
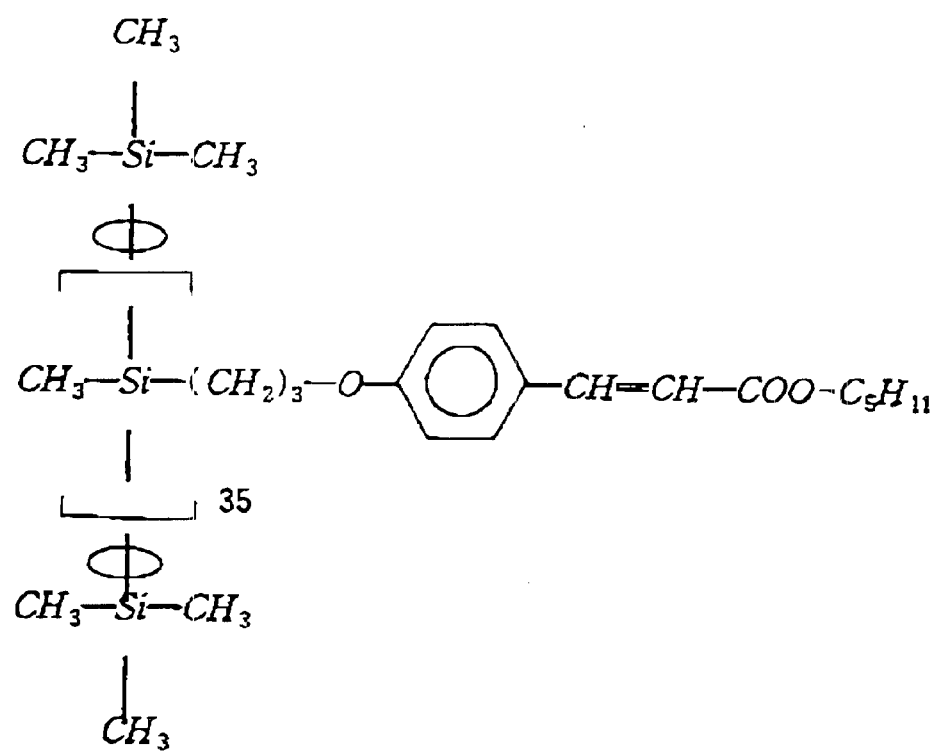
FIG. 3 shows the chemical structure of photoalignment material PSCN-3 according to an embodiment of the present invention.
Figure 4:
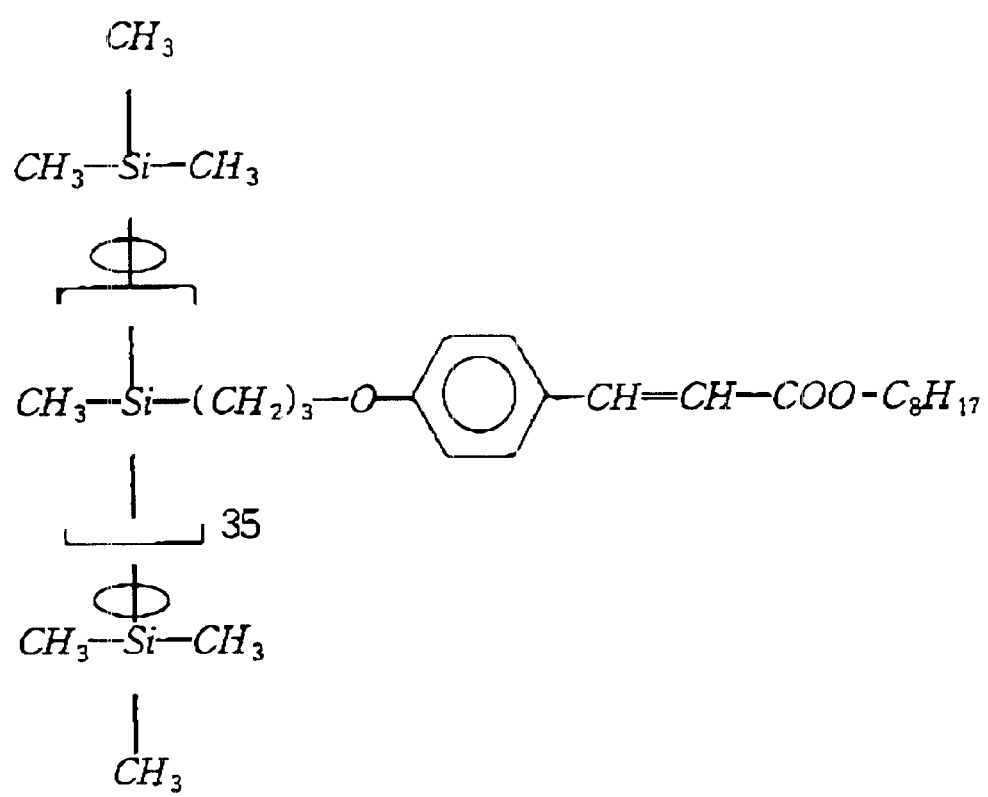
FIG. 4 shows the chemical structure of photoalignment material PSCN-4 according to an embodiment of the present invention.

The same effect was observed for other photoalignment materials, PSCN-3, PSCN-4, the chemical structures of which are shown in FIGS. 3 and 4, respectively.

In accordance with the present invention, these materials, and other such compounds, can thus be used to control the easy axes direction on an alignment surface by changing the irradiation dose of light to produce a binary multi-domain director orientation in an LC cell. Further, multi-domain LCDs can be readily created with wide viewing angle characteristics while reducing the number of photomasks used in the process, and without rearranging the optical scheme or exposure apparatus during domain fabrication. Moreover, the present invention can be used to manufacture high density optical information storage cells where information is encoded in accordance with the binary direction of the easy axis.

Figure 5:
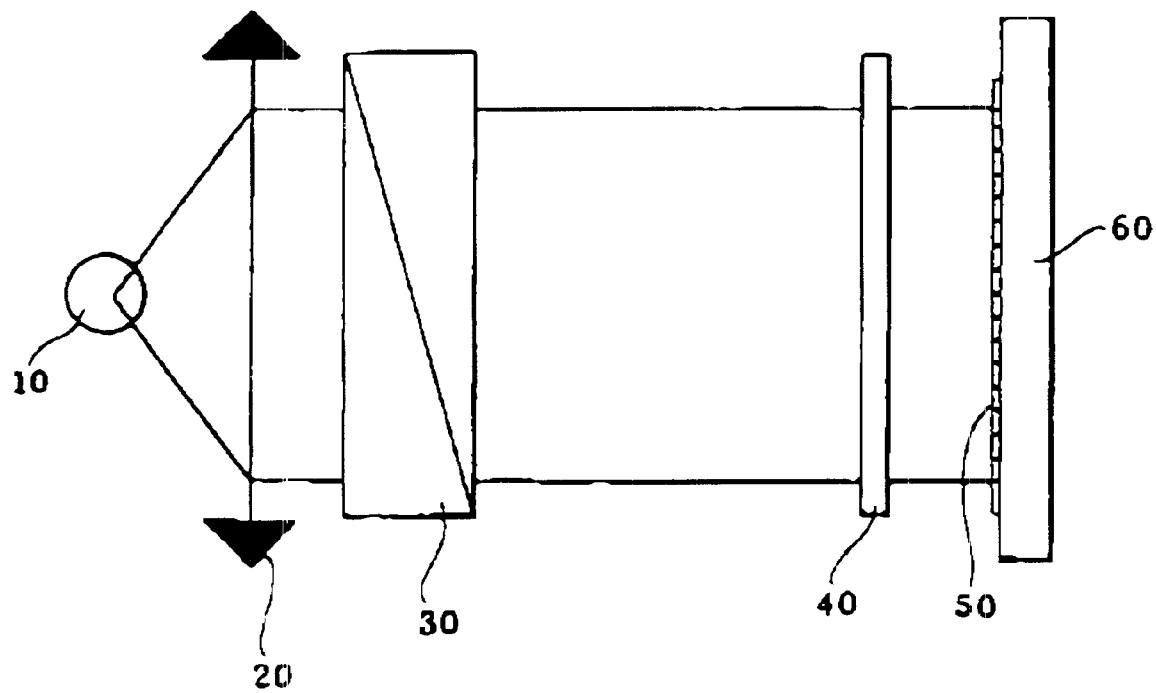
FIG. 5 shows a device for controlling alignment direction according to an embodiment of the present invention.

FIG. 5 is a schematic diagram showing a device for controlling an alignment direction according to the present invention. Substrate 60 is covered with photosensitive material 50 preferably having an easy axis direction for the LC molecules which can be shifted depending upon the dose of incident UV light (D). Photosensitive material 50 is irradiating with the UV light from an Hg-lamp 10 transmitted through a lens 20, polarizer 30, and photomask 40 positioned close to the substrate 60.

Figure 6:
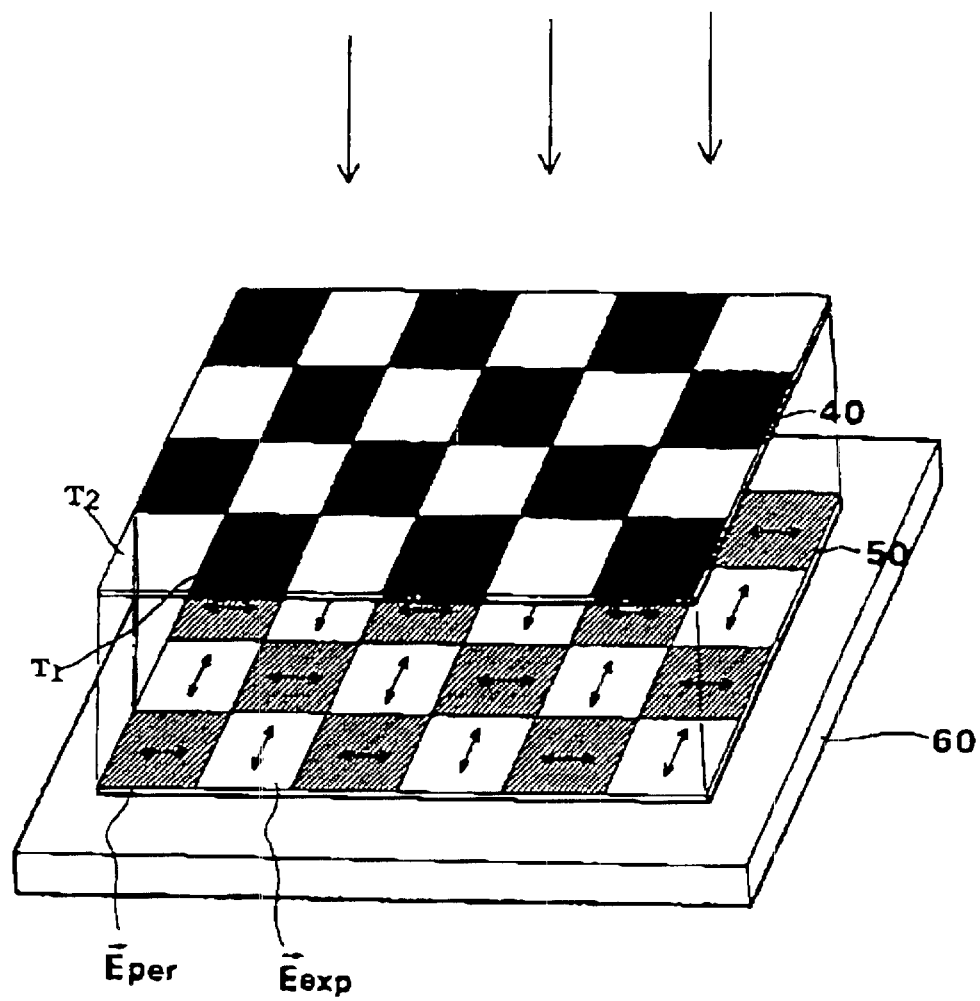
FIG. 6 shows a partial perspective view of FIG. 5.

As shown in FIG. 6, Photomask 40 includes first regions having a first transmissivity $T_1$, and second regions having a second transparency $T_2$. The radiation dose transmitted through the first regions of photomask 40 is preferably smaller than the threshold $D_{thr}$ (a threshold dose of light, above which the alignment direction is perpendicular to $E_{exp}$), but is enough to produce a first alignment direction parallel to $E_{exp}$ in corresponding first portions of photosensitive mask 40 having transmissivity $T_2$ is larger than $D_{thr}$. As a result, the first portions of layer 50 impart easy axes to the LC molecules parallel to $E_{exp}$, and the second portions impart easy axes e perpendicular to $E_{exp}$.

In accordance with a further embodiment of the present invention, the first and second portions of photosensitive layer 50 are produced by controlling exposure time to match the conditions required for producing orthogonal easy axes. That is, the substrate can be irradiated twice through a photomask having "dark" and "transparent" regions. In the first step, the entire photosensitive material layer 50 is illuminated without a mask for a time necessary to establish the first alignment direction ($E_{exp}$). In the second step, using a mask, only portions of photosensitive layer 50 corresponding to "transparent" regions of the mask are illuminated for a time necessary to shift the first alignment direction to a second alignment direction $\underline{E}_{exp}$, which is perpendicular to the first alignment direction. As a result, regions of photosensitive layer 50 not exposed during the second step have the first alignment direction parallel to $E_{exp}$ while portions irradiated during the second step through transparent parts of the mask have the second alignment direction $\underline{E}_{exp}$ perpendicular to $E_{exp}$.

The method according to the present invention can be used for information storage in an LC well where optical information is recorded as a binary code by producing pixels with LC molecules oriented along orthogonal directions.

In accordance with the present invention, a binary domain LCD with wide viewing angle characteristics can be obtained. FIG. 7 illustrates a schematic diagram of two-domain TN (twisted nematic) structure of this invention. Each domain corresponds to an asymmetric viewing angle characteristic, but the total viewing characteristic, which is the sum of the asymmetric viewing angle characteristic of each domain, has a symmetric viewing angle. Thus, the main viewing angle is compensated.

The preferred embodiment of the present invention will now be further described in reference to specific examples. It should be understood that these examples are intended to be illustrative only and the present invention is not limited to the conditions and materials noted therein. Various modifications can be achieved within the technical scope of the present invention. For example, as a modification of the proposed method, a scanned light beam can be used instead of the irradiation through a photomask. In which case, the intensity of the beam can be varied in order to deliver an appropriate energy dose to the desired portion of the photosensitive layer.

EXAMPLE 1

A solution polymer material PSCN-1 in a 1:1 mixture of 1,2-dichloroethane an chlorobenzene was prepared. The concentration of the polymer was 10 g/l. A polymer film was then spin-coated onto a substrate with a rotation speed of 2500 rev/min. The substrate coated with the polymer film was prebaked after centrifuging at a temperature of 200° C. for 2 hours.

The substrate were then positioned in the set up depicted in FIG. 5. The Hg-lamp 10 served as a source of the UV-light and the total power of the UV light in the plane of the photomask was 2 mW at 250 nm. A photomask having a binary transparent pattern was provided. Each square pattern of pixels of the mask had an area of 4 mm×4 mm. The illuminated area of the photomask was 2 cm×3 cm. The transparency of the "transparent" region was 85%, while transparency of the "semi-transparent" region was 30%. The substrate was irradiated for 10 minutes.

After irradiating and drying the substrates, the LC cell having a gap of 50 micrometers was assembled by a commonly used sandwich technique. The cell was filled with LC material, ZLI 4801-000, at room temperature, and the orientation was measured with a polarized microscope.

EXAMPLE 2

The process of the second example is identical to the first[,]. except the photosensitive materials includes 20% PSCN-2 and 80% PSCN-1. The substrates were irradiated for 5 minutes with the same result as in the first example.

EXAMPLE 3

The process of the third example is similar to the first, except PSCN-3 was used as the photosensitive material. The cell was filled at an evaluated temperature of 100° C. and the LC, ZLI4801-000, was injected while in an isotropic phase. The substrates were irradiated for 16 minutes and yielded the same result as in the first example.

EXAMPLE 4

The process of the fourth embodiment is the same as the first example[,]. except the cell was filled as an elevated temperature of 100° C. and the LC, ZLI4801-000, was injected in an isotropic phase. The substrates were irradiated for 20 minutes, and the same result was obtained as in the first example.

EXAMPLE 5

The substrates were first prepared as in the first example. At first, the entire substrates were irradiated without a photomask for 5 minutes. The substrates were then irradiated through a binary photomask for 10 minutes. The photomask has a pixel pattern having alternating opaque and transparent regions, with each square pixel occupying an area of 4 mm×4 mm, and illuminated area of the photomask was 2 cm×2 cm. The transmissivity of the "transparent" region was 98%, and the transmissivity of the "dark" or opaque region was 1%. The photomask was then removed and the LC cell was assembled and filled with LC, ZLI 4801 000, as described in the first example.

EXAMPLE 6

Two substrates were successively coated with a transparent electrode layer and photoalignment material were prepared as in the first example. The substrates were irradiated through a photomask having a checker board pattern of "semi-transparent (T=30%)" and "transparent (T=85%)" square regions, each with an area of 3 mm×3 mm. The substrate was irradiated for 15 minutes. The LC cell with a cell gap of 5 $\mu$m was assembled with domain twist structures having appropriate director orientations. The cell was filled at an elevated temperature of 100° C. and the injected LC, ZLI 4801-000, was in an isotropic phase.

It will be apparent to those skilled in the art that various modifications and variations can be made in the method for manufacturing a liquid crystal display of the present invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A liquid crystal cell, comprising:

a substrate;

a photosensitive material covering said substrate; and an unrubbed photosensitive alignment layer formed via a non-rubbing treatment by irradiating a light over said substrate, said unrubbed photosensitive alignment layer having a first region and a second region, wherein said first region has a first alignment direction depending on a first energy dose imparted on said first region and said second region has a second alignment direction depending on a second energy dose imparted on said second region, wherein the second energy dose is different from said first energy dose.

2. The liquid crystal cell as defined in claim 1, wherein the second alignment direction is perpendicular to the first alignment direction.

3. The liquid crystal cell as defined in claim 1, wherein said unrubbed photosensitive alignment layer comprises a material selected from the group consisting of PSCN-1, PSCN-2, PSCN-3 and PSCN-4.

4. A liquid crystal cell, comprising:

a first substrate;

a first photosensitive material covering said first substrate;

a first unrubbed alignment layer formed via a non-rubbing treatment by irradiating a light over said first substrate, said first unrubbed alignment layer having a first region and a second region, wherein said first region has a first alignment direction depending on a first energy dose imparted on said first region and said second region has a second alignment direction depending on a second energy dose imparted on said second region, wherein the second energy dose is different from said first energy dose;

a second substrate;

a second photosensitive material covering said second substrate;

a second unrubbed alignment layer formed by irradiating a light over said second substrate, wherein said first and said second substrates are positioned such that said first and second alignment layers face one another; and a liquid crystal material, said liquid crystal material placed between said first and second substrates.

5. The liquid crystal cell as defined in claim 4, wherein the second alignment direction is perpendicular to the first alignment direction.

6. The liquid crystal cell as defined in claim 4, wherein said first unrubbed alignment layer comprises a material selected from the group consisting of PSCN-1, PSCN-2, PSCN-3 and PSCN-4.

7. An unrubbed photosensitive layer for storing information, comprising:

a first region of said unrubbed photosensitive layer formed via a non-rubbing treatment by irradiating a substrate covered by a photosensitive material with light, said first region having a first orientation depending on a first dose of radiation imparted on said first region, wherein said first dose of radiation corresponds to first information; and a second region of said unrubbed photosensitive layer formed via a non-rubbing treatment by irradiating said substrate with a light, said second region having a second orientation depending on a second dose of radiation imparted on said second region, wherein said second dose of radiation corresponds to second information, wherein the second dose of radiation is different from said first dose of radiation.

8. The unrubbed photosensitive layer as defined in claim 7, further comprising:

a liquid crystal material in contact with said first and second regions of said photosensitive material, wherein first molecules of said liquid crystal material are in contact with said first region of said photosensitive material, said first molecules being arranged in a first direction corresponding to said first information, and second molecules of said liquid crystal material are in contact with said second region of said photosensitive material, said second molecules being arranged in a second direction corresponding to said second information.

9. The unrubbed photosensitive layer as defined in claim 7, further comprising a material selected from the group consisting of PSCN-1, PSCN-2, PSCN-3 and PSCN-4.

10. A liquid crystal comprising:

a substrate;

an unrubbed photosensitive alignment layer formed over said substrate via a non-rubbing treatment, wherein said alignment layer shifts from a first alignment direction corresponding to a first energy dose imparted on said unrubbed photosensitive alignment layer to a second alignment direction corresponding to a second energy dose imparted on said unrubbed photosensitive alignment layer, wherein the second energy dose is different from said first energy dose.

11. The liquid crystal cell as defined in claim 10, wherein said first alignment direction is substantially perpendicular to said second alignment direction.

12. The liquid crystal cell as defined in claim 10, wherein said unrubbed photosensitive alignment layer includes a material selected from the group consisting of PSCN-1, PSCN-2, PSCN-3 and PSCN-4.

* * * * *